(12) United States Patent
Brischke et al.

(10) Patent No.: US 11,351,817 B2
(45) Date of Patent: Jun. 7, 2022

(54) ROLLER AND ATTACHMENT DAMPING PART FOR A ROLLER

(71) Applicant: TENTE GmbH & Co. KG, Wermelskirchen (DE)

(72) Inventors: Daniel Brischke, Wermelskirchen (DE); Wolfgang Block, Wermelskirchen (DE); Karl-Heinz Plautz, Hagen (DE)

(73) Assignee: TENTE GmbH & Co. KG, Wermelskirchen (DE)

( * ) Notice: Subject to any disclaimer, the term of this patent is extended or adjusted under 35 U.S.C. 154(b) by 24 days.

(21) Appl. No.: 16/964,749

(22) PCT Filed: Jan. 11, 2019

(86) PCT No.: PCT/EP2019/050641
§ 371 (c)(1),
(2) Date: Jul. 24, 2020

(87) PCT Pub. No.: WO2019/145164
PCT Pub. Date: Aug. 1, 2019

(65) Prior Publication Data
US 2021/0053395 A1    Feb. 25, 2021

(30) Foreign Application Priority Data

Jan. 25, 2018 (DE) ...................... 10 2018 101 653.0

(51) Int. Cl.
*B60B 33/04*    (2006.01)
*B60B 33/00*    (2006.01)

(52) U.S. Cl.
CPC ........ *B60B 33/045* (2013.01); *B60B 33/0018* (2013.01); *B60B 33/0021* (2013.01);
(Continued)

(58) Field of Classification Search
CPC ............ B60B 33/045; B60B 2900/131; B60B 2900/133; B60B 33/0018; B60B 33/0021;
(Continued)

(56) References Cited

U.S. PATENT DOCUMENTS 3,194,293 A * 7/1965 Kindley .............. B60B 33/0028
16/45
3,210,795 A * 10/1965 Fontana .............. B60B 33/0002
16/273
(Continued)

FOREIGN PATENT DOCUMENTS

DE    20 2010 010 103 U1    11/2011
EP    0 075 910 A1    4/1983
(Continued)

OTHER PUBLICATIONS

International Search Report of PCT/EP2019/050641, dated May 2, 2019.
(Continued)

*Primary Examiner* — Jeffrey O'Brien
(74) *Attorney, Agent, or Firm* — Collard & Roe, P.C.

(57) ABSTRACT

A roller has a wheel, a wheel axle and a pin which protrudes upward from a housing of the roller. A sleeve sits on the pin and is spaced apart from the pin radially and axially upward by a damping material arranged between the sleeve and the pin, the damping material being arranged so that all axial and/or radial contact between the pin and the sleeve is prevented. Alternatively, an attachment damping part can be arranged on a pin of the roller in overlap with the pin, wherein the attachment damping part has an inner sleeve and an outer sleeve, the inner sleeve being spaced apart radially and axially upward by a damping material arranged between the inner sleeve and the outer sleeve. The damping material
(Continued)

is arranged in such a way that all axial and/or radial contact between the inner sleeve and the outer sleeve is prevented.

12 Claims, 14 Drawing Sheets

(52) U.S. Cl.
CPC ...... *B60B 33/0042* (2013.01); *B60B 33/0049* (2013.01); *B60B 33/0057* (2013.01); *B60B 2900/131* (2013.01)

(58) Field of Classification Search
CPC ............ B60B 33/0042; B60B 33/0049; B60B 33/0057
USPC .......................................................... 16/44
See application file for complete search history.

(56) References Cited

U.S. PATENT DOCUMENTS

| | | | | |
|---|---|---|---|---|
| 3,768,116 A * | 10/1973 | Propst | ................. | B60B 33/0002 16/43 |
| 4,229,856 A * | 10/1980 | Sparkes | .............. | B60B 33/0042 16/31 R |
| 5,394,589 A * | 3/1995 | Braeger | .............. | B60B 33/0028 16/44 |
| 6,499,184 B2 * | 12/2002 | Plate | ..................... | B60B 33/045 16/29 |
| 6,668,965 B2 * | 12/2003 | Strong | ..................... | B60J 1/008 16/35 R |
| 6,796,568 B2 * | 9/2004 | Martis | ...................... | A61G 5/06 267/152 |
| 7,093,319 B2 * | 8/2006 | Lemeur, Jr | ............ | B60B 33/045 16/45 |
| 8,776,314 B2 | 7/2014 | Hofrichter et al. | | |
| 8,904,598 B2 * | 12/2014 | Waitz | .................. | B60B 33/0068 16/35 R |
| 9,862,229 B2 | 1/2018 | Hofrichter et al. | | |
| 2013/0111700 A1 * | 5/2013 | Waitz | .................. | B60B 33/0068 16/44 |

FOREIGN PATENT DOCUMENTS

| | | |
|---|---|---|
| EP | 2 720 882 B1 | 5/2015 |
| EP | 2 741 924 B1 | 7/2015 |
| JP | 2016-016031 A | 2/2016 |
| WO | 2013/023917 A2 | 2/2013 |

OTHER PUBLICATIONS

English translation of DIN 53 420, "Testing of Cellular Materials—Determination of Apparent Density," Dec. 1978, total of 2 pages.

\* cited by examiner

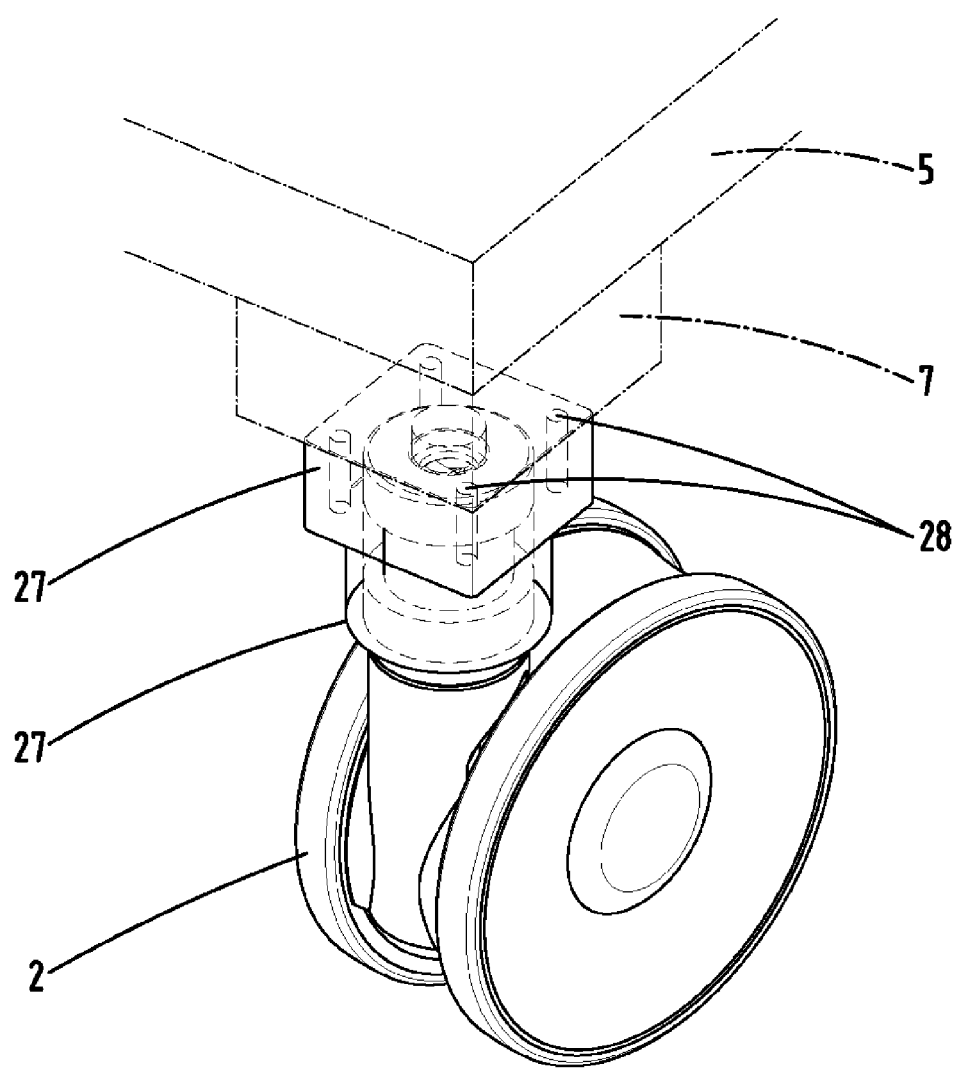

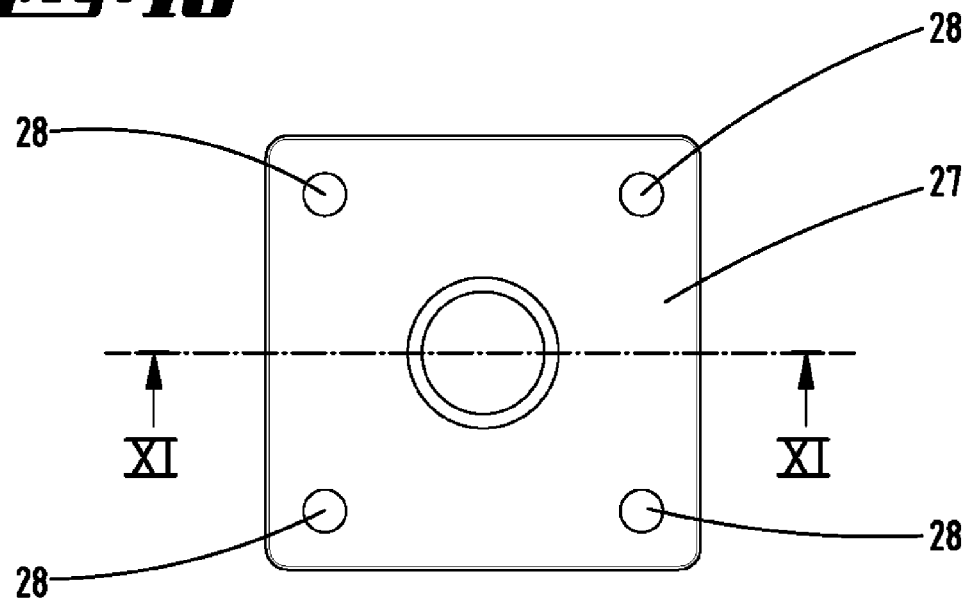
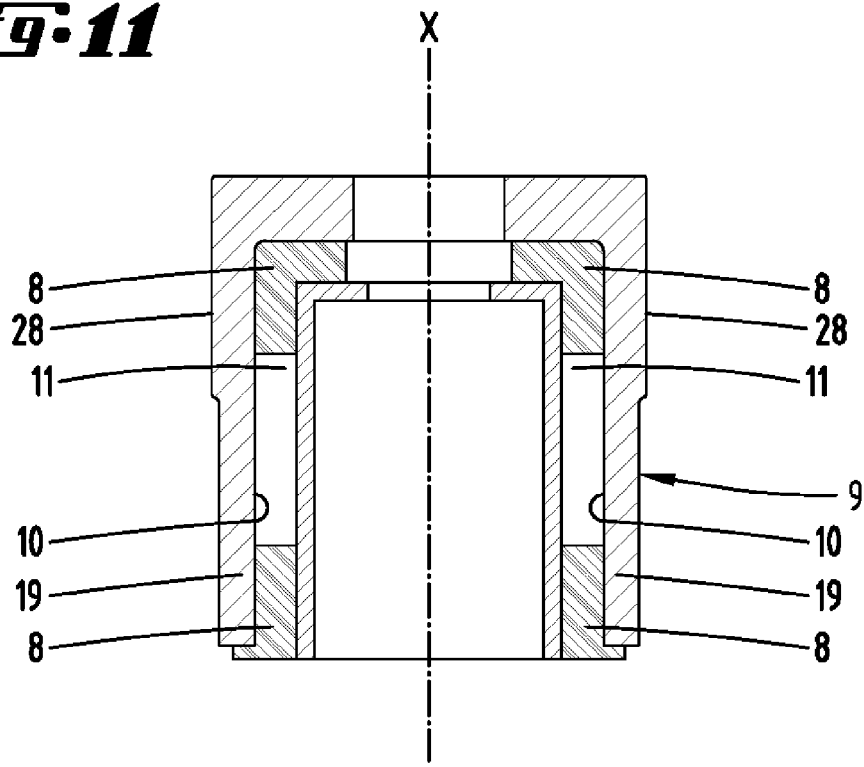

ROLLER AND ATTACHMENT DAMPING PART FOR A ROLLER

CROSS REFERENCE TO RELATED APPLICATIONS

This application is the National Stage of PCT/EP2019/050641 filed on Jan. 11, 2019, which claims priority under 35 U.S.C. § 119 of German Application No. 10 2018 101 653.0 filed on Jan. 25, 2018, the disclosure of which is incorporated by reference. The international application under PCT article 21(2) was not published in English.

TECHNICAL FIELD

The invention initially relates to a roller comprising a wheel and a wheel axle, wherein a pin is provided, which protrudes upward from a housing of the roller in the normal usage position.

Furthermore, the invention relates to an attachment damping part for a roller.

BACKGROUND INFORMATION

Rollers of the type in question are already known in various respects. Thus, a roller as a type of double caster is known, for example from EP 2 741 924 B1, which is pivotable about a vertically-aligned axis in the normal usage position. The wheel or the wheels of the roller may be locked with respect to their rotation about the geometric wheel axis. This locking, like the pivot fixing of the roller as a whole, may be achieved via mechanical means. A roller of this type is known from EP 2 720 882 B1 (U.S. Pat. No. 8,776,314 B2), in which the pivot fixing and/or the wheel locking may be carried out electromechanically.

The pin, protruding upward from a housing [of the] roller in the normal usage position, generally functions as a so-called mounting pin. The pin of the roller is plug-in mounted, for example, in a frame-side recess.

There is a need to achieve shock absorption for these types of rollers, for example, in the arrangement of the same on frames for medical devices or the like. Medical devices, in particular, and also other sensitive devices, transported on corresponding carriages, may suffer damage due to shocks. In addition, such a shock absorption is also advantageous for carriages for other uses.

For this purpose, a damping part, furthermore for example, an attachable damping part may be used for the roller.

A roller is known from EP 0075910 A1, in which an outer sleeve is provided, which may function as the plug section of a plug-in arrangement in a socket of an object. However, forces are transmitted between the pin of the roller and the sleeve only in the sense of shear forces. This leads to a high load on the damping material and also on the connection of the damping material to the pin or to the sleeve.

A roller is known from U.S. Pat. No. 3,768,116 A, in which the pin protruding past the housing is covered by a mounting sleeve and has a damping material on the outside of the mounting sleeve. The roller is accommodated directly in a socket of a truck bracket by means of the pin and the damping material. A roller for a suitcase is known from DE 20 2010 010 103 U1, in which the mounting pin is arranged directly in a fixing receptacle of a suitcase-side mounting part, with an interposition of damping material. A roller is known from JP 2016-16031 A, in which the mounting pin is arranged directly in a holding part of a wheelchair by means of damping material. Finally, the damped configuration of a wheel of the roller is known from U.S. Pat. No. 5,394,589 A. With respect to a rocker-type arrangement of the roller, a damping material is also described between the rocker bracket and a housing part of the roller.

BRIEF SUMMARY OF THE INVENTION

[Arising from the prior art according to EP 0075910 A1, the invention is directed toward the task of specifying a roller which is favorably designed with advantageous damping.

This problem is solved with respect to a roller wherein the sleeve is also spaced apart from the pin axially above by the damping material arranged between the sleeve and the pin, wherein the damping material is arranged in such a way that all axial and/or radial contact between the pin and the sleeve is prevented, that the pin has an upward facing pin end face and the damping material is arranged overlapping the pin end face, that the sleeve has a downward facing sleeve end face, that the damping material is arranged overlapping the sleeve end face, and furthermore that the damping material designed overlapping the pin end face leaves a through opening extending in the direction of the central axis of the pin.

This problem is further solved in that the damping material leaves an area free of damping material at least across a partial axial height so that two damping material sections are provided in a usage position of the roller: an axially lower damping area, assigned to the downward facing edge of the sleeve, and an axially upper damping area.

This problem is additionally solved by an embodiment in which the wheel axle comprising an axle sleeve is accommodated in an axle cavity of a hub of a wheel, wherein an elastic material is accommodated between the axle sleeve and the axle cavity, and that a radial recess is designed in an outer surface of the axle sleeve across an axial length, in which recess the elastic material is accommodated.

Furthermore, the invention is directed toward the task of specifying an advantageous attachment damping part.

This problem is solved by an embodiment in which the inner sleeve is arranged spaced radially apart with respect to the normal usage position of the roller provided with the attachment damping part by damping material arranged between the inner sleeve and the outer sleeve, that the inner sleeve is also spaced apart axially above by the damping material, that the damping material is arranged in such a way that all axial and/or radial contact between the inner sleeve and the outer sleeve is prevented, that fixing means are provided on the inner sleeve which enable a fixing of the attachment damping part on the roller, that the fixing means are designed as screws and that the screw, interacting with an internal thread of the inner housing, is actuatable through an opening in the outer sleeve.

With respect to the roller, a so-called floating mounting is achievable in the plug-in connection of the roller with a carriage or the like. Any shocks may thus no longer be transmitted, at least essentially no longer be transmitted, via the roller to the carriage. Instead, a sufficient shock absorption is provided in preferably every load position of the roller due to the strict spacing apart of sleeve and pin by the damping material provided. A factual decoupling may be achieved with respect to shocks transmitted between the roller and the frame or the carriage, on which the roller is attached.

[The damping acts with respect to an axis, aligned vertically in the normal usage position of the roller, which may simultaneously be a pivot axis for the roller in the axial direction, and also, preferably, in the radial direction.

The damping material provided forms the binding element between the roller-side pint and the sleeve which is now provided. The sleeve hereby takes on the function of a so-called mounting pin, and may correspondingly function, for example, as the plug-in arrangement of the roller in a corresponding receptacle of a carriage or the like.

The section of the damping material designed to overlap the pin end face, which section may additionally solely form the damping material as a whole in one possible embodiment, all contact between the pin and sleeve is prevented, in particular in the axial direction. The sleeve may thus be supported in one possible embodiment solely via the damping material on the pin end face.

With respect to the attachment damping part, a retrofitting part is this specified for a conventional roller with a pin. The attachment damping part is arrangeable on a pin of the roller, surrounding the same preferably with an inner sleeve part. The outer sleeve part may accordingly take on the function of a mounting pin or a mounting configuration, for fixing the roller, for example, on a carriage. In this case is well, a so-called floating mounting of the roller in the usage position is achievable due to the strict distancing of the inner and outer sleeve from one another, which is preferably both in the axial and also in the radial direction. The damping part functions here as a binding element between the inner and the outer sleeves. The inner sleeve may hereby, as is also preferred, directly contact the pin of the roller both in the circumferential direction and also in the axial direction.

The damping material may be designed solely, or in addition to the previously described arrangement, between two surfaces radially opposite one another. Thus, an annular space may result between the pin and the sleeve, which enables an arrangement of the damping material between the radially outward facing outer surface of the pin and the radially inward facing inner surface of the sleeve. A radial spacing of the pin and sleeve is achievable due to such an arrangement.

In addition, the sleeve may a downward facing sleeve end face. The damping material may hereby be arranged overlapping the sleeve end face. Thus, the damping material may additionally be designed between two axially opposite surfaces, namely preferably the upward facing pin end face and the downward facing sleeve end face.

In one potential embodiment, the damping material, designed to overlap the pin end face, may retain a through opening extending in the direction of the central axis of the pin. Thus, an annular configuration of the damping material may be provided with respect to the central axis of the pin. With respect to a cross section in a vertical plane when viewed in a normal usage position of the roller, the damping material may also transition as one piece and materially-uniformly from an annularly shaped section between the end faces of the sleeve and the pin into a collar-shaped section, circumferential with respect to the pin axis, between the outer surface of the pin and the inner surface of the sleeve. A pot-shaped configuration of the damping material may thus result.

The sleeve may have a mounting formation assigned to the pin end face. A fixing of the roller on the object provided with the roller, for example a carriage or the like, is facilitated via the mounting formation.

Thus, the mounting formation may be formed, for example, as a plate part, in particular a plate part which extends with a major surface parallel to the plane of the pin end face.

The plate part may have an opening, preferably multiple openings, thus, for example, to facilitate a screw fixing of the roller to an object. The relevant openings may be provided, according to one possible embodiment, in an area of the mounting formation spaced apart form the sleeve outer surface.

The damping material may be glued or welded to the sleeve and/or to the pin. A connection to the sleeve and/or to the pin may also be achieved by overmolding in the course of the production of the damping material in a plastic injection process.

Using the damping material, a non-releasable connection may be provided, as is also preferred, between the pin and sleeve in normal operation, in particular with respect to a load in the axial or pull direction and also with respect to the pin axis in the circumferential direction.

The damping material may also consist of one or more spring parts, alternatively of a rubber material, additionally alternatively of a foamed material or a thermoplastic elastomer. Thus, the damping, elastic material may additionally be constructed so that it always endeavors to retake its original shape.

The use of different materials is possible. For example, a hard rubber may function as the material. The use, for example, of wave-shaped springs is likewise conceivable. The damping material may also be formed on the basis of a foamed material. For this purpose, for example, a material based on polyurethane is suitable. Such a material is known, for example, under the trademark "Cellasto®". Reference is made at this point to the publication "Elastogran" by the BASF Group, namely "18011-2001". According to the invention, an advantageous material characteristic value consists in that the damping material has an apparent density of 350 kg/m$^3$ to 650 kg/m$^3$. This characteristic is determined by testing according to DIN 53420.

The damping material may be inserted under pretension between the pin and the sleeve. The damping material may be compressed for this purpose, for example, at approximately 30%

The damping material may be designed to leave an axial area free of the damping material at least across a part of the axial height of the pin. Furthermore, the damping material, for example, assigned to the axial end areas of the pin, may extend in the circumferential direction. These damping material areas are spaced apart from one another, so that an annular space may result, delimited solely by the outer surface of the pin and by the inner surface of the sleeve. An axial area, free of the damping material, may thus be correspondingly designed to be circumferentially continuous.

In one potential refinement, which may, however, also be important in and of itself, the wheel axle is accommodated in an axle cavity of a hub of the wheel by means of an axle sleeve, wherein an elastic material is accommodated between the axle sleeve and the axle cavity. With respect to the elastic material, reference is made to the potential material selection with regard to the damping material.

As a result of the proposed arrangement, a so-called floating mounting of the wheel is also achieved here. Thus, shocks may already be at least partially absorbed in the area of the wheel mount. The axle sleeve hereby directly accommodates the wheel axle in one potential and preferred embodiment. In contrast, the axle cavity in the hub of the wheel is always spaced apart from the wheel axle, preferably both in the radial direction and also in the axial direction with respect to the geometric wheel axis, so that all axial and/or radial contact is prevented between the axle sleeve and the axle cavity.

Thus, a radial recess may be designed in an outer surface of the axle sleeve across an axial length, in which recess the elastic material is accommodated. The elastic material may thus be secured as a result of inserting in the recess in the axial direction. The elastic material may have a sleeve like configuration in and of itself, hereby adapted, if necessary, to the axial and/or radial dimensions of the, if necessary, radial recess provided in the outer surface of the axle sleeve.

The elastic material may hereby project in the radial direction past an outer surface of the axle sleeve connecting to the radial recess. This connecting outer surface results in an axial extension to the radial recess. The elastic material inserted into the recess may hereby extend by an amount, preferably in the tenths of millimeter range, across this outer surface, for example across 2/10 mm or 3/10 mm, up to, for example, 5/10 mm.

The length of the elastic material may be adapted in the axial direction to the axial length of the axle cavity, if necessary, having the axial length of the axial cavity. Thus, a full-surface support of the axle sleeve on the elastic material across the inward facing sleeve surface may additionally be provided according to one preferred embodiment.

The previously described features, in particular with respect to the damping made possible between the pin and the sleeve also relate in their full scope to the previously described attachment damping part, with the proviso that the pin is formed by the inner sleeve and the sleeve is formed by the outer sleeve. Correspondingly, the damping material extends when in the embodiment of an attachment damping part substantially between the inner and the outer sleeves, as this is described between the pin and the sleeve in the case of the previously described roller.

In one embodiment as an attachment damping part, which is preferably assignable to the pin of the roller, fixing means may be provided on the inner sleeve which enable a fixing of the attachment damping part on the roller, in particular on the pin. A non-detachability of the attachment damping part on the roller may result from the fixing means alone.

Thus, the fixing means may be formed in one potential embodiment as latching means, for example, in the form of a spring-assisted ball catch or additionally, for example, in the form of a spring tab.

Alternatively, the fixing means may also be screws, for example, threaded pins, which are supported on the end face in the sleeve to achieve a clamping with respect to the outer surface of the pin.

The screw (threaded pin), interacting with an internal thread of the inner sleeve, may be actuatable through an opening in the outer sleeve. The outer opening in the outer sleeve is, preferably, provided in radial overlap with the screw, additionally preferably in an area, in which no damping material is provided between the inner and the outer sleeves. If necessary, however, the damping material may also have a through opening correspondingly positioned for actuating the screw.

The inner sleeve may have a first central opening, in particular in the upward facing sleeve end face in the normal usage position, and the outer sleeve may have a second central opening, wherein the first and the second central openings of the inner and outer sleeves may be arranged in a projection in the direction of the central axis of the pin or of the inner sleeve coaxial to one another and coaxial to the through opening of the damping material. Thus, a central through opening, aligned coaxial to the pin axis, may result as a whole in the end face area of the attachment damping part, by which means the inner space delimited by the inner sleeve is connected to the environment outside of the outer sleeve.

The first and second central openings may be connected to a plug element consisting of an elastic material, said plug element may have one or more through openings, like, for example, an electrical connecting cable. The plug element may be formed materially identically or have comparable features as the elastic material in the area of the wheel axis and/or in the area between the inner and outer sleeves. Thus, while a direct connection of the inner and outer sleeves is optionally provided via the plug element, this is, however, achieved via an elastic material, so that this connection is also shock absorbing. The optional electrical connecting cable guided through the plug element may, for example, be used for electrical control of a roller according to EP 2 720 882 B1 mentioned at the outset.

BRIEF DESCRIPTION OF THE FIGURES

The invention is subsequently explained in greater detail by way of the appended figures, however, only one exemplary embodiment is depicted. A part, that is only explained with respect to one of the exemplary embodiments, and is not replaced by another part in another exemplary embodiment due to the special feature established there, is thus also described for this additional exemplary embodiment as an at least potentially present part. As seen in the drawings:

FIG. 9 a perspective depiction corresponding to FIG. 3 with an attachment damping part attached on the roller in an alternative embodiment;

FIG. 10 the attachment damping part from the embodiment according to FIG. 9 in a top view;

FIG. 11 the cross section according to line XI-XI in FIG. 10;

DETAILED DESCRIPTION OF THE INVENTION

Figure 1:
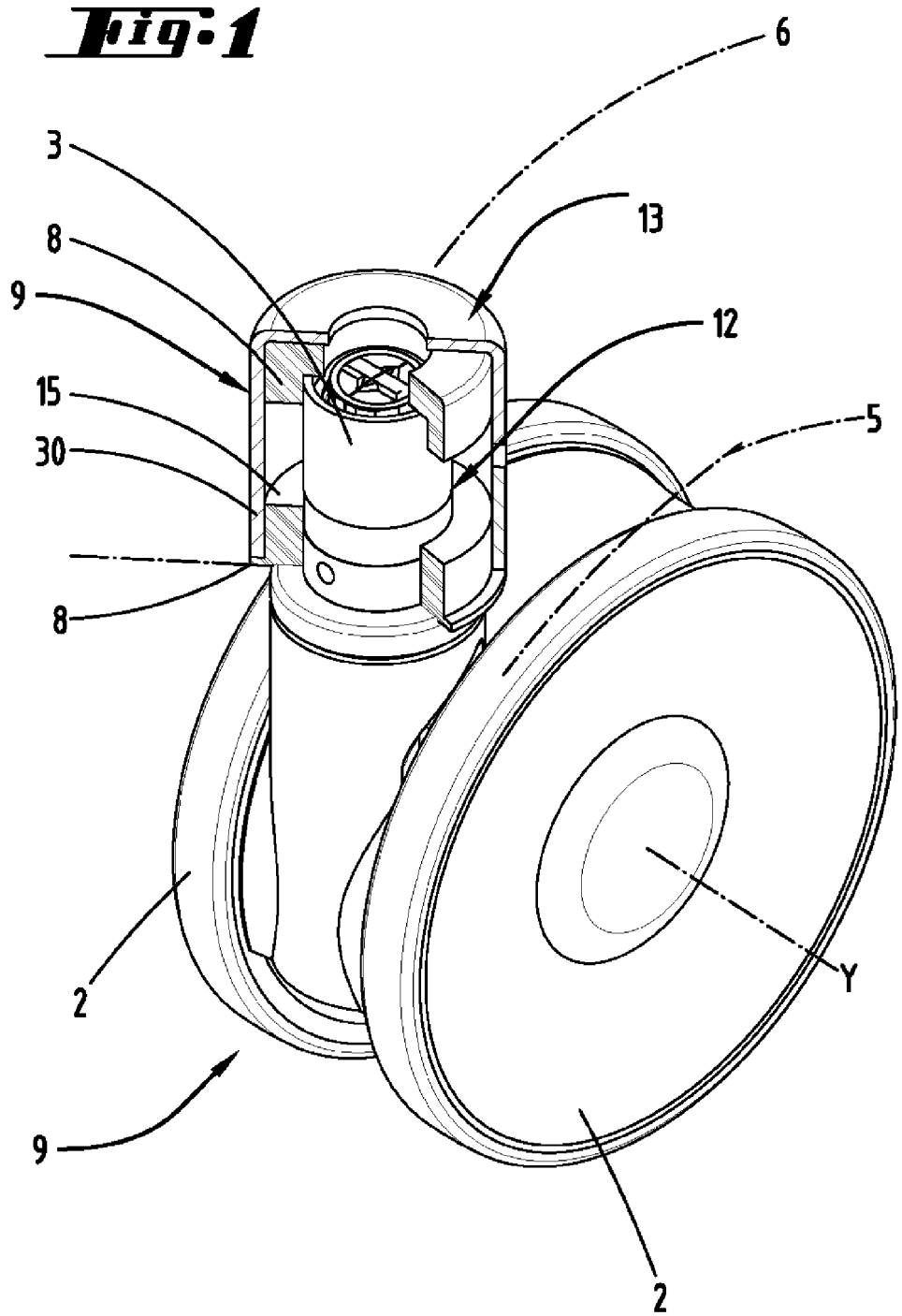
FIG. 1 a roller in a perspective depiction relating to a first embodiment.

A roller 1, which is designed as a double caster in the depicted embodiment, is depicted and described initially with reference to FIG. 1. Roller 1 has two wheels 2 in the case of a double caster and a pin 3. An electromotor may be arranged in pin 3, whose electrical connection may be defined by an electrical connecting cable 4 leading upwards, preferably centrally, out of pin 3. Reference is made to EP 2 720 882 B1, mentioned at the outset, regarding the function and the arrangement of the electromotor and the other control means in roller 1. The content of this patent document is thus completely included in the disclosure of the present invention, also for the purpose of including features of this patent document in the claims of the present invention.

In the normal usage position, pin 3 is vertically aligned with a central pin axis x. Pin axis x is, in the case of the embodiment of roller 1 as a caster, simultaneously the steering axis.

The geometric rotational axis y of wheels 2 is aligned transversely to pin axis x, thus substantially horizontal in the normal usage position.

In the embodiment depicted, pin 3 functions indirectly for arranging roller 1 on an object 5, for example, a carriage, thus, in the case of a plug-in arrangement, having a correspondingly designed socket 6, or having a correspondingly designed mounting surface 7 in the case of another arrangement.

Figure 2:
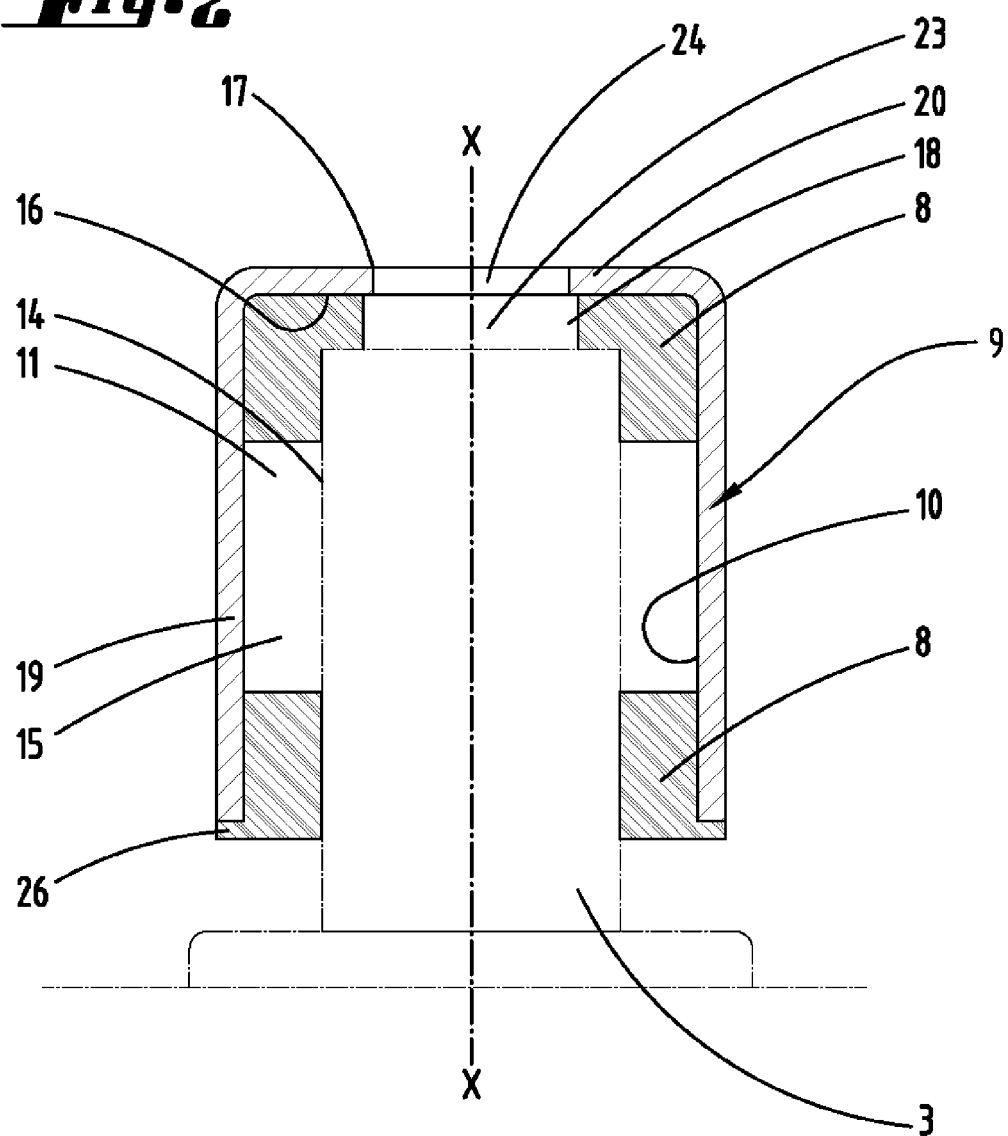
FIG. 2 a longitudinal sectional view through a pin area of the roller.
Figure 3:
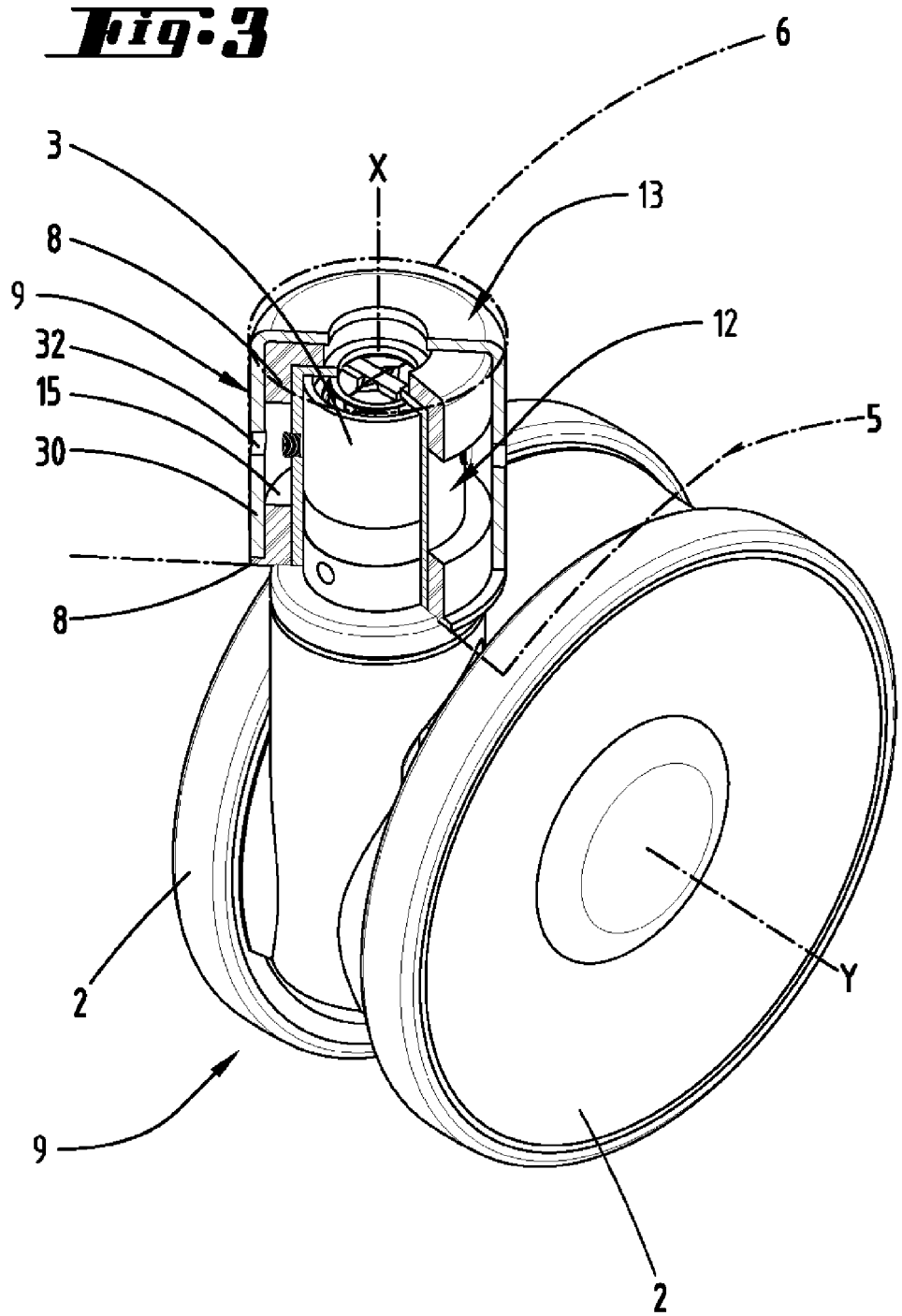
FIG. 3 the roller in a perspective depiction with an attached attachment damping part in one embodiment.
Figure 4:
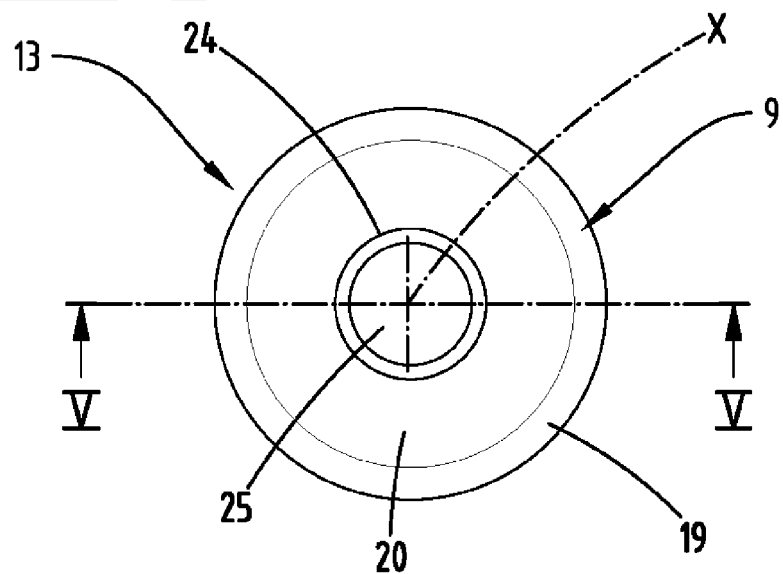
FIG. 4 the attachment damping part of the embodiment according to FIG. 3 in a top view.
Figure 5:
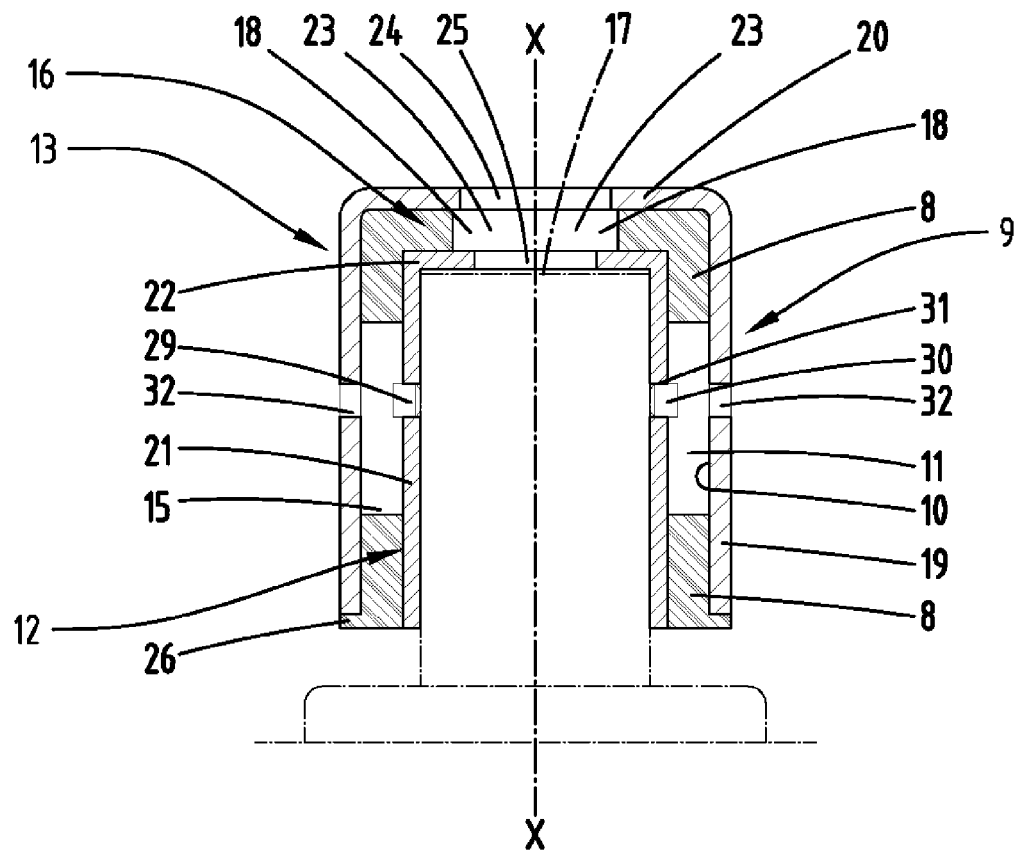
FIG. 5 the cross section according to line V-V in FIG. 4.
Figure 6:
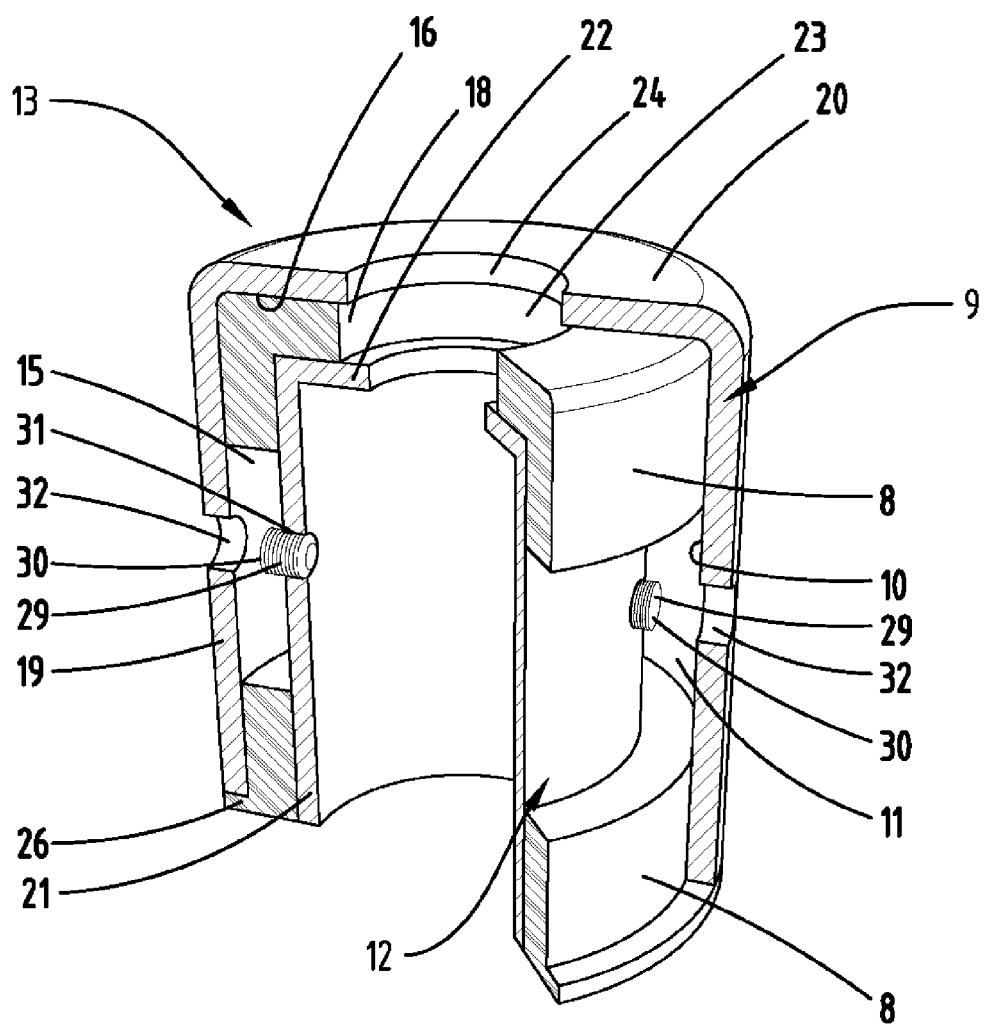
FIG. 6 the attachment damping part of the embodiment according to FIG. 3 in a perspective sectional view.

Damping material 8 is provided between socket 6 or mounting surface 7 of object 5 and roller-side pin 3, and thus substantially roller 1 as a whole, in particular for damping impacts. This damping material is initially and substantially arranged and designed in an area between the outer side of pin 3 and an outer sleeve 9 overhanging pin 3 (compare FIGS. 1 and 2).

Outer sleeve 9 forms the plug-in section interacting with socket 6 in the case of a plug-in arrangement of roller 1 on object 5, for example according to the depiction in FIG. 1.

Outer sleeve 9 is expanded, in comparison to the outer diameter of pin 3, in the radial direction with respect to pin axis x, and is additionally preferably selected to be longer than pin 3 in the axial extension.

An annular space 11 thus arises peripherally between the outer surface of pin 3 and the radially inward facing inner surface 10 of outer sleeve 9, said annular space has a radial dimension, resulting between the outer surface of pin 3 and inner surface 10 of outer sleeve 9, which may correspond to 2 to 4 times the material thickness of outer sleeve 9, additionally to approximately one-sixth to one-fourth, furthermore for example approximately one-third of the pin diameter, when viewed transverse to pin axis x.

Embodiments are depicted in the drawings of FIGS. 3 to 16, in which damping material 8 is not arranged directly between pin 3 and outer sleeve 9, but instead between outer sleeve 9 and an inner sleeve 12. As a result, an attachment damping part 13 is thus created, which is suitable for attaching onto pin 3, thus is further suitable for retrofitting a conventional roller 1.

The inner diameter of inner sleeve 12, and preferably also the axial length, is additionally preferably adapted to the diameter and the axial length of pin 3 in the case of an embodiment of an attachment damping part 13.

In the arrangement of an inner sleeve 12, an annular space 11 also arises between the outer surface of inner sleeve 12 and inner surface 10 of outer sleeve 9, in which annular space damping material 8 is accommodated and arranged.

A floating mounting of outer sleeve 9, which may be brought into a contact position with object 5, is achieved with respect to roller 1 due to damping material 8. Shocks or the like are absorbed during operation of roller 1.

Damping material 8 may extend across the entire periphery and the entire axial height of annular space 11 according to one potential embodiment. However, an embodiment is preferred, in which damping material 8 preferably leaves a damping material-free area 15 across a partial axial height, which may correspond to approximately half to ⅔ of the axial length of the pin. This area 15 may, as is also preferred, be designed as circumferentially continuous.

Due to the previously described measures, two damping material sections may be defined, namely, as also preferred, a damping area which is axially lower in the usage position, assigned to the downward facing edge of outer sleeve 9, and an axially higher damping area, preferably (when viewed in cross section) in a transition from annular space 11 into an axial clearance 18 arising between the downward facing sleeve end face 16 and the upward facing pin end face 17 or the cover of inner sleeve 12 overlapping this pin end face 17.

The axial dimension of clearance 18 may substantially correspond to the radial dimension of annular space 11.

Outer sleeve 9 has a sleeve wall 19 and a sleeve cover 20. Sleeve wall 19 extends coaxial to pin axis x. Sleeve cover extends in a transverse plane to pin axis x, more preferably parallel to pin end face 17.

In the case of the configuration of an attachment damping part 13, inner sleeve 12 then provided is likewise provided with a circumferential sleeve wall 21, which directly surrounds outer surface 14 of pin 3. Furthermore, inner sleeve 12 may be supported on pin end face 17 via a sleeve cover 22.

According to the embodiments shown in FIGS. 3 to 12, in particular the vertically upper section of damping material 8 may also extend into the area of axial clearance 18. Correspondingly, the arrangement of damping material 8 also results in overlapping pin end face 17 or sleeve cover 22 assignable to the same and sleeve end face 16 of outer sleeve 9.

When overlapping pin end face 17 or sleeve cover 22 of inner sleeve 12, damping material 8 leaves a through opening 23 extending in the direction of central axis x of pin 3 in the area engaging into axial clearance 18.

A (second) central opening 24, designed coaxial to pin axis x, is provided in outer sleeve 9 in its sleeve cover 20 on the upper and lower side of this through opening 23 in damping material 8.

In the case of the arrangement and configuration of an inner sleeve 12, sleeve cover 22 may also be provided with a first central opening 25.

The two central openings 24 and 25 may, as is also depicted, be reduced in diameter with respect to through opening 23 of damping material 8.

The vertically lower section of damping material 8 may also have, along the downward facing end area, a radially outwardly directed, circumferential collar section 26, on which the facing end face surface of outer sleeve 9 may be supported (compare FIG. 5, 7, 8, or 11).

Due to the previously described arrangement and configuration of damping material 8 between the inner and outer sleeves or between the pin and the outer sleeve, a spacing of the pin is provided, if necessary with the directly arranged inner sleeve 12, to outer sleeve 9 in such a way that all axial and also radial contact between the pin or inner sleeve 12 and outer sleeve 9 is prevented. A direct contact of pin 3 or inner sleeve 12 and outer sleeve 9 and accordingly object 5 is suppressed.

Instead of a plug-in mounting of roller 1 on object 5, as depicted in FIGS. 3 to 8, a screw mounting of roller 1 on a mounting surface 7 of object 5 may also be carried out by way of example. For this purpose, attachment damping part 13 or outer sleeve 9 assigned to pin end face 17 may have a mounting formation 27 extending outward, if necessary, radially outward past the outer diameter dimension of outer sleeve 9. This mounting formation may be designed according to the embodiment in FIGS. 9 to 12 as rectangular, in particular square in outline; alternatively, according to the embodiment in FIGS. 13 to 16, it may also be in the form of a circular disk part.

In any case, mounting formation 27 may be formed as a whole as a plate part. This may additionally have multiple openings 28, for example, for screw fixing of roller 1 to object 5.

Damping material 8, which is a foamed material or a thermoplastic elastomer in one possible and also preferred embodiment, may be glued or also welded to outer sleeve 9 on the wall inner side and to inner sleeve 12 on the wall outer side in a configuration with an attachment damping part 13, and to the inner surface of outer sleeve 9 and the outer surface of pin 3 in a direct configuration on pin 3.

If an attachment damping part 13 with an inner sleeve 12 is provided, then attachment damping part 13 may be designed for fixing to pin 3. Correspondingly, inner sleeve 12 may have fixing means 29 for interacting with pin 3. Thus, according to the depiction in FIG. 5, fixing means 29 may be designed as a screw 30, for example, in the form of a threaded pin. This screw 30 is inserted in an internal thread 31 in the area of sleeve wall 21 of inner sleeve 12. The relevant threaded bore is continuous, so that the screw tip is suitable for applying a clamping action against outer surface 14 of pin 3. Screw 30 may, as is also preferred, be exposed for actuation using a screwing tool by an opening 32, formed in sleeve wall 19 of outer sleeve 9, in a radial extension to screw 30 or internal thread 31 in inner sleeve 12.

Figure 7:
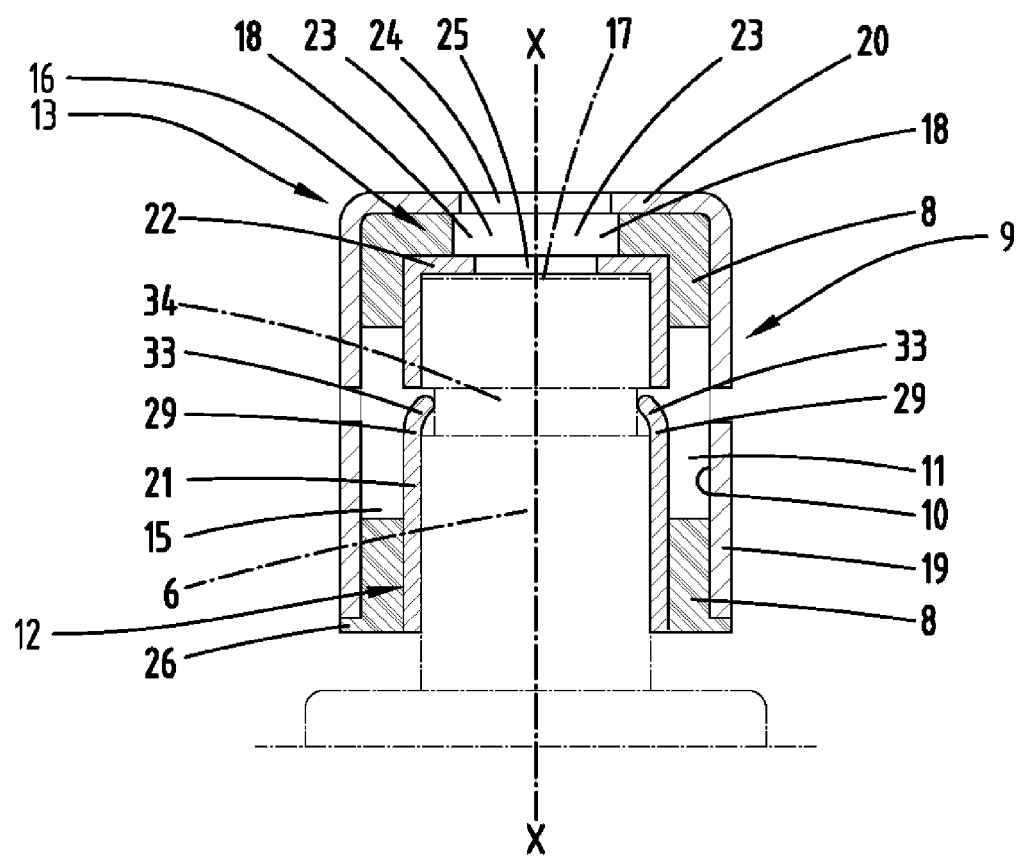
FIG. 7 a depiction corresponding to FIG. 5; however, relating to an alternative embodiment.

Fixing means 29 may also be designed, as indicated in FIG. 7, as latching means 33, thus, for example, formed by a correspondingly arranged cut out in sleeve wall 21 of inner sleeve 12, whereby a radially inwardly projecting latching projection is established, which may deviate elastically radially outwardly in the direction of annular space 11, in particular in the course of attaching attachment damping part 13 on pin 3. Pin 3 may have a counter latching means 34, for example, in the form of an annular groove, circumferential with respect to pin axis x, into which latching means 33 may engage preferably in a positive-locking way.

Figure 8:
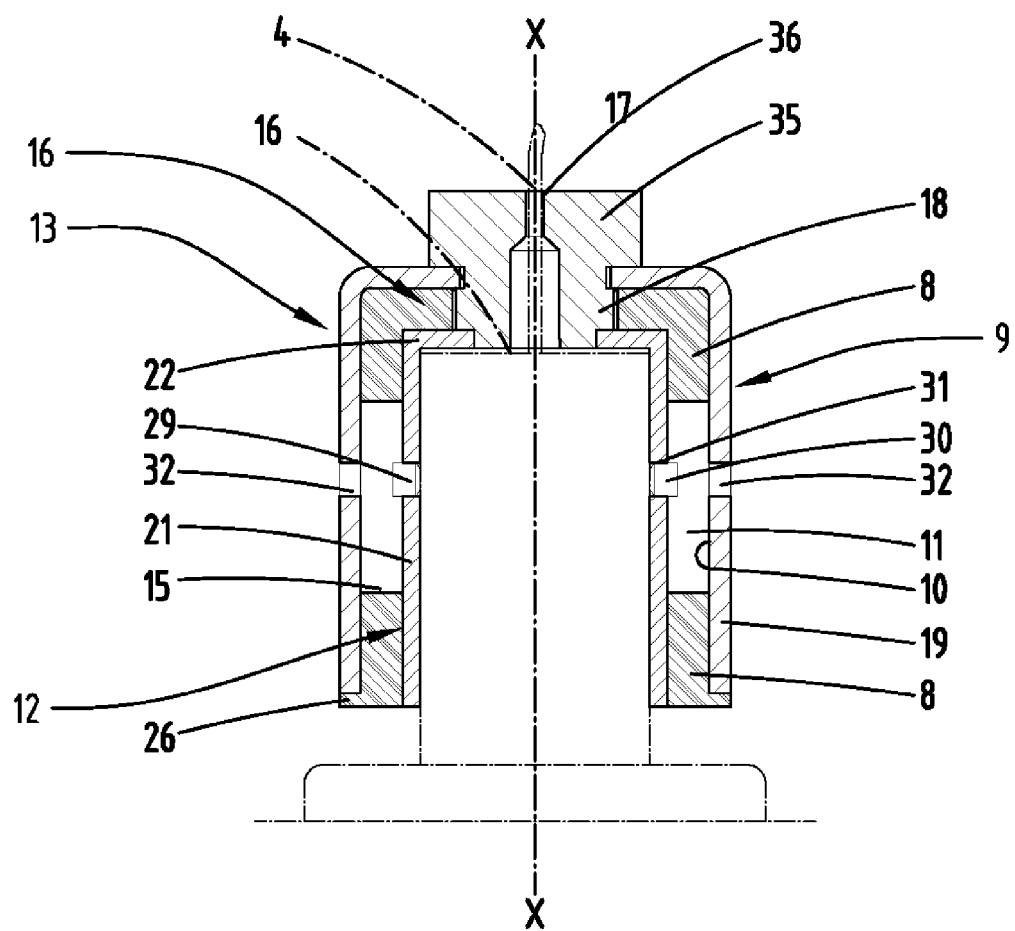
FIG. 8 another depiction corresponding to FIG. 5, relating to another embodiment of the attachment damping part.
Figure 12:
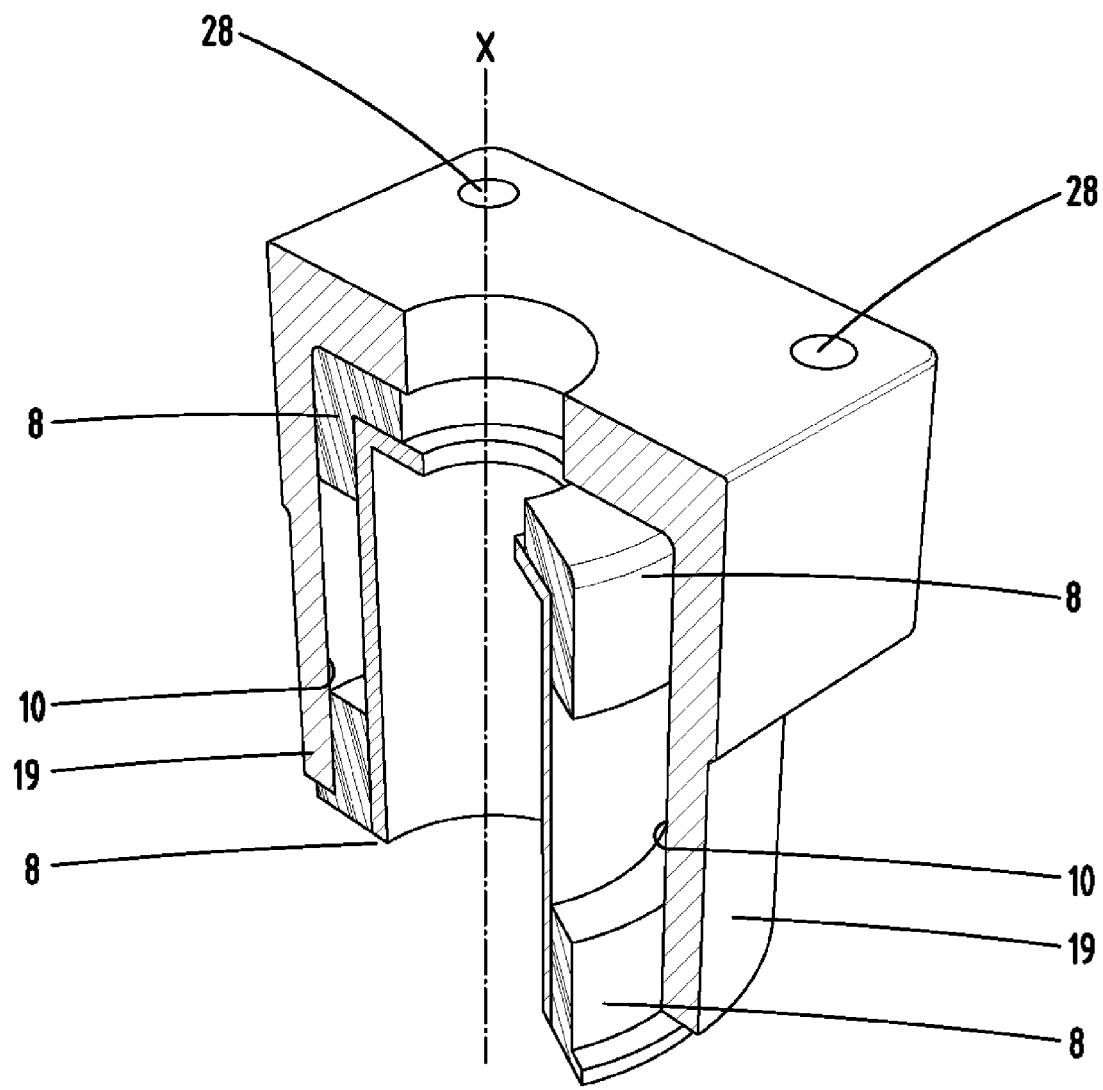
FIG. 12 the attachment damping part from the embodiment according to FIG. 9 in a perspective sectional view.
Figure 13:
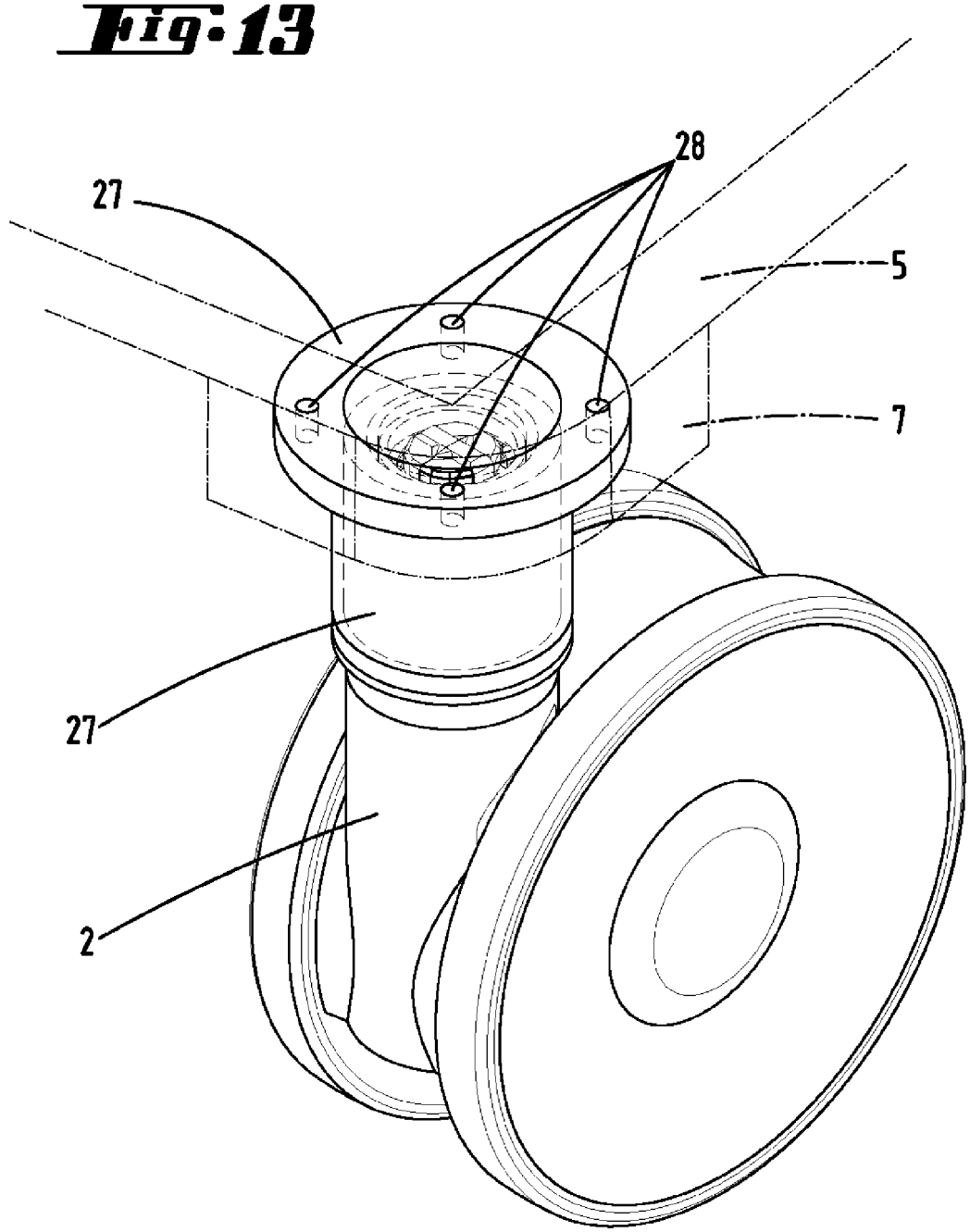
FIG. 13 another depiction of a roller with an attachment damping part in another embodiment corresponding to FIG. 3.
Figure 14:
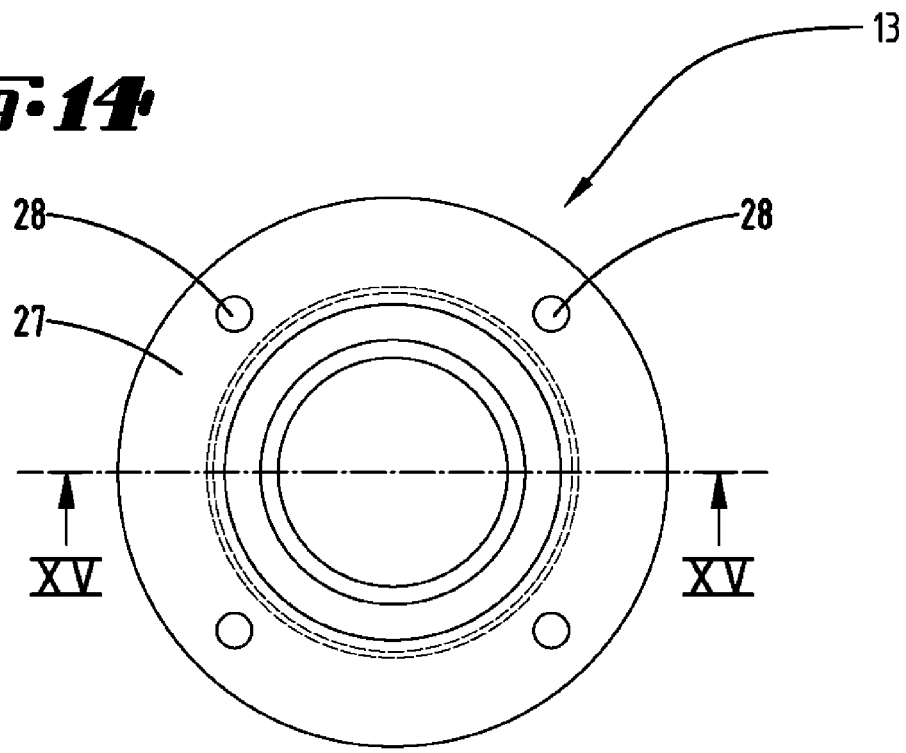
FIG. 14 the attachment damping part from the embodiment according to FIG. 13 in a top view.

According to the depiction in FIG. 8, a plug element 35 may also be provided with a central through opening 36 in the embodiment. Plug element 35 may be arranged in the area of the end faces, hereby substantially connecting first and second central opening 25, 24 of the sleeve covers of inner sleeve 12 and outer sleeve 9. Plug element 35 is likewise preferably produced from a damping material, if necessary, as is also more preferred, from the same or comparable material as damping material 8. Plug element 35 preferably consists of a rubber or rubber-like material. By this means, outer sleeve 9 is also correspondingly decoupled with respect to inner sleeve 12 despite the plug connection.

Through opening 36 may, as is also preferred, function for guiding a connecting cable 4 outward, for example in the configuration of roller 1 as an electrically operatable roller.

FIGS. 13 to 16 show one embodiment of an attachment damping part 13, in which outer sleeve 9 is merely composed from sleeve wall 19 encircling pin axis x and a mounting formation 27 extending radially outward on the upper end in the usage position.

Inner sleeve 12 is likewise merely composed from sleeve wall 21 and a lower collar 37 projecting radially outward. A sleeve cap is omitted in the depicted embodiment for both the inner sleeve and also outer sleeve 9.

Damping material 8 extends in the depicted embodiment, circumferentially with respect to pin axis x, between the radially outward facing surface of inner sleeve 12 and inner surface 10 of outer sleeve 9, wherein damping material 8 extends without interruption across the entire axial height in which a radial overlap is provided by sleeve wall 19 of outer sleeve 9 and sleeve wall 21 of inner sleeve 12.

Figure 15:
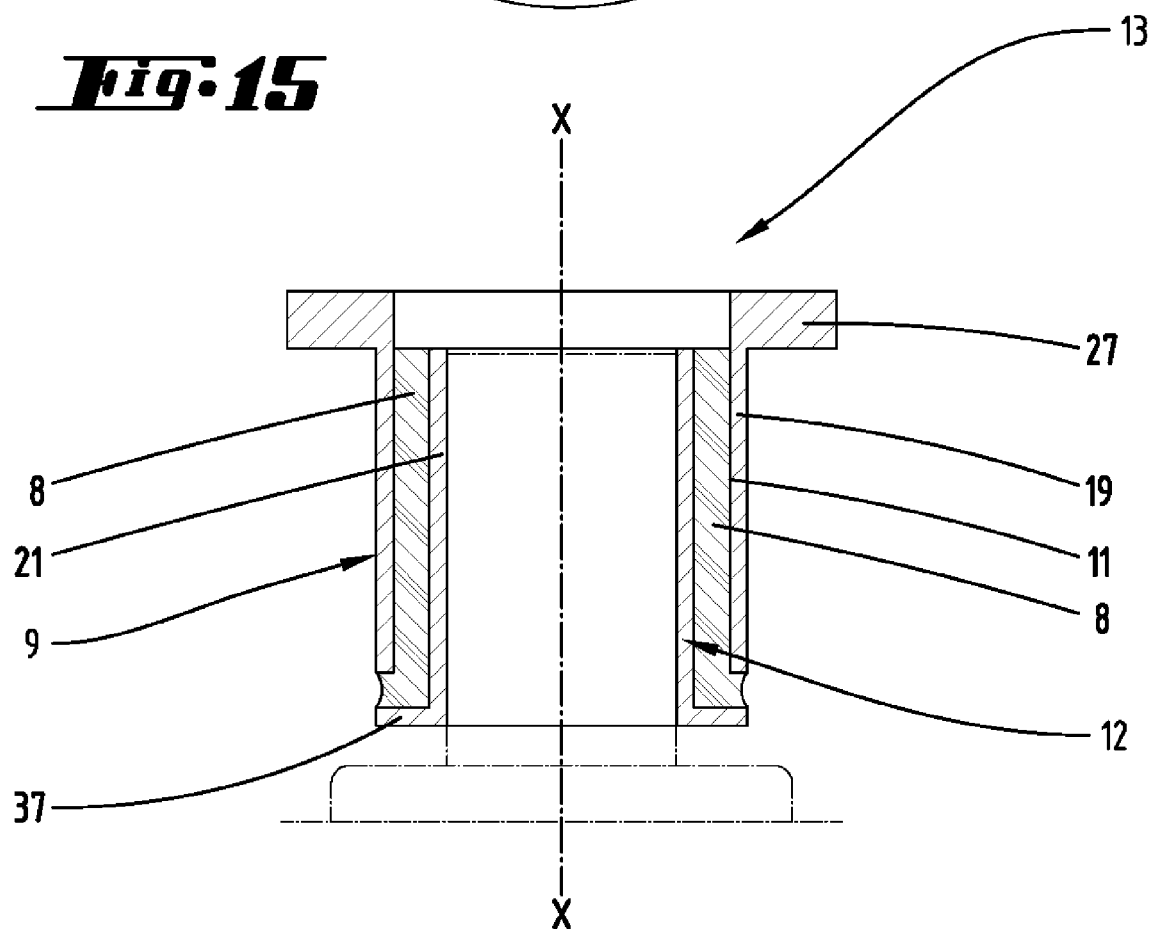
FIG. 15 the cross section according to line XV-XV in FIG. 14.
Figure 16:
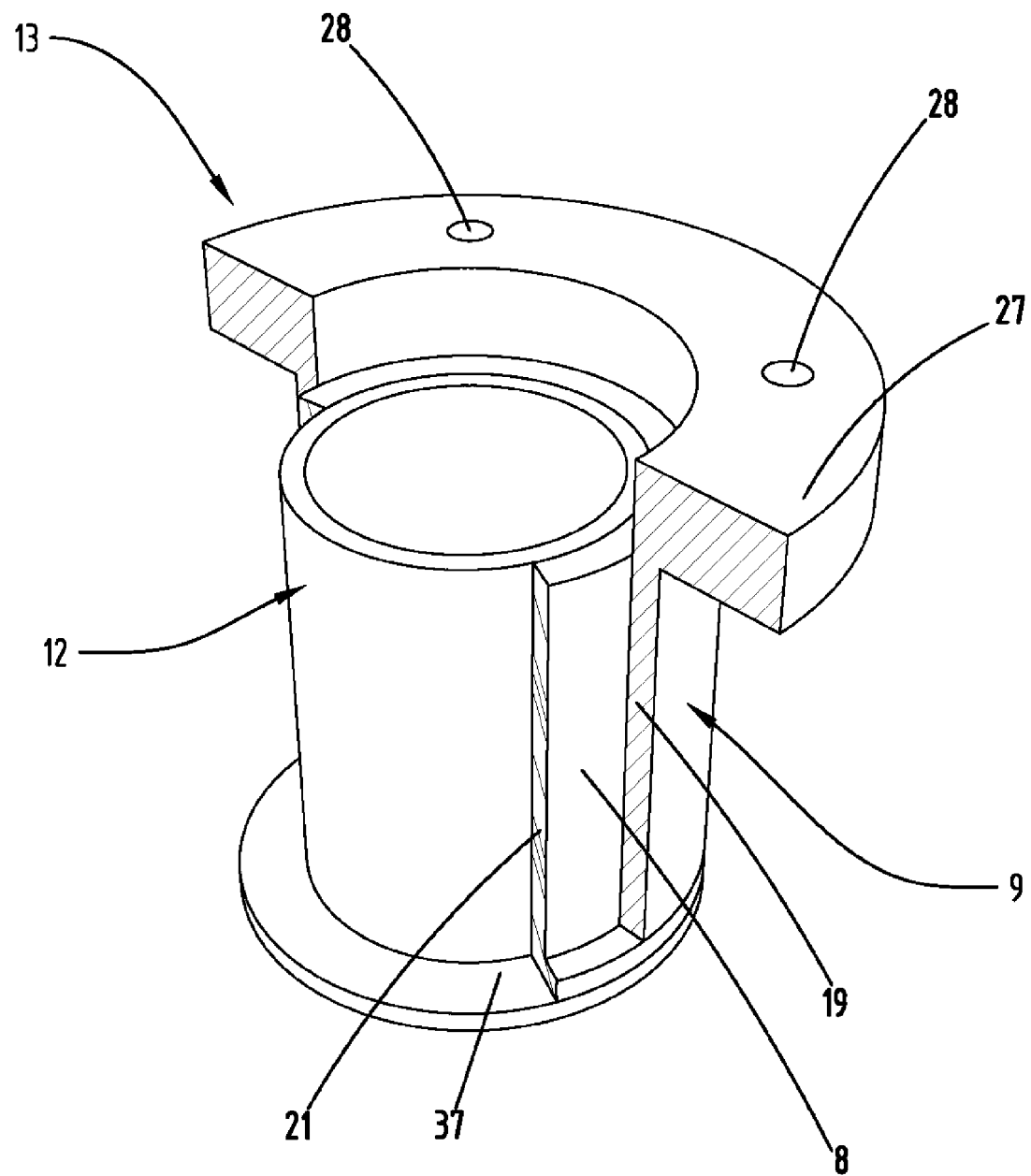
FIG. 16 the attachment damping part from the embodiment according to FIG. 13 in a perspective sectional view.

In addition, damping material 8 extends outward above the top of collar 37, hereby underneath the facing end wall surface of outer sleeve wall 19 (compare FIG. 15).

A contact of the inner and outer sleeve or a contact of the pin and the outer sleeve is also prevented by this arrangement, both in the radial direction and also in the axial direction.

Another improvement of the shock absorption may be achieved by a corresponding shock absorbing of wheels 2.

Figure 17:
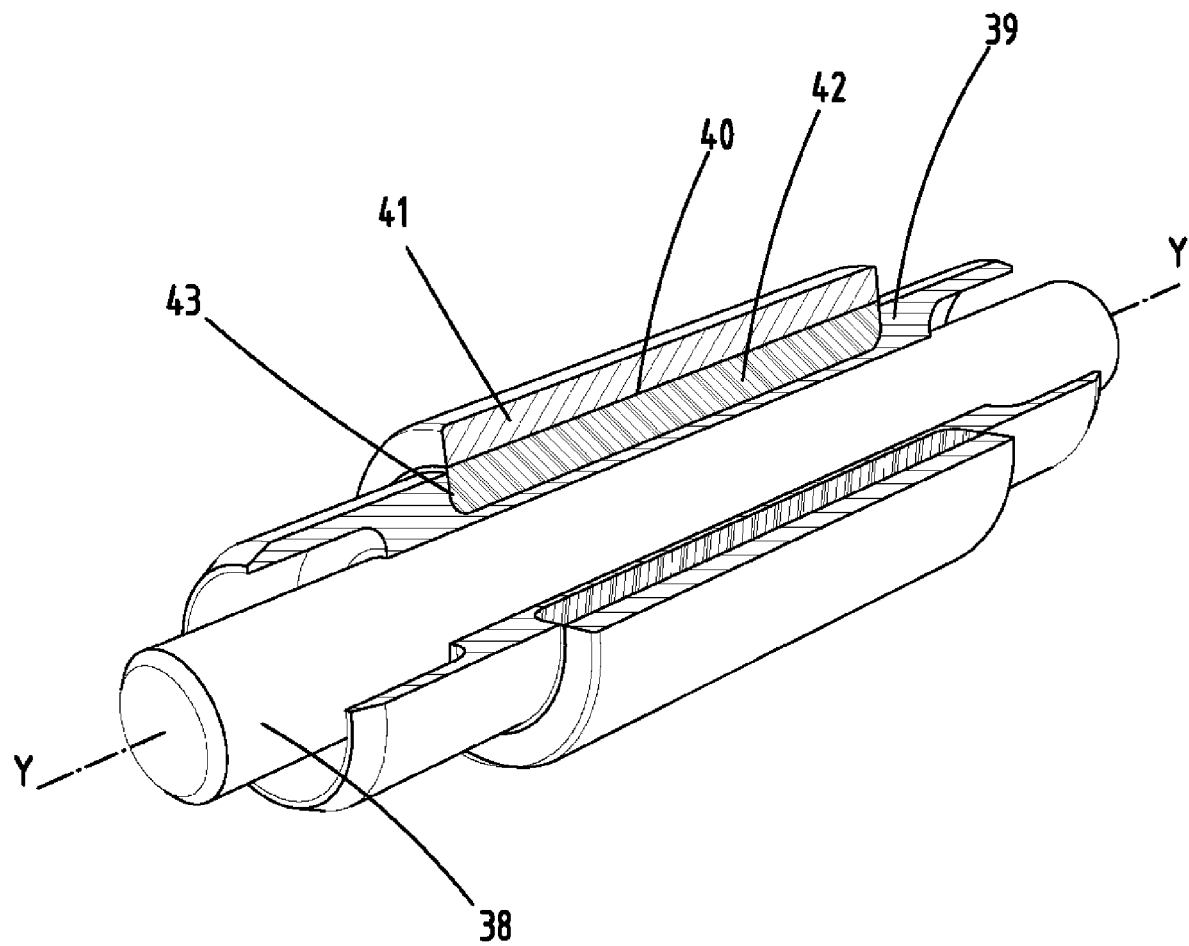
FIG. 17 the area of an axle sleeve for a wheel axle accommodated in an axle cavity of a wheel in a perspective sectional view.

According to the depiction in FIG. 17, the physical wheel axle 38 is set in an axle sleeve 39 surrounding the same. Axle sleeve 39 directly provides the mounting for wheel axle 38 in one potential embodiment.

Axle sleeve 39 is indirectly accommodated in an axle cavity 40 of a hub 41 of the wheel or of wheels 2.

An elastic material 42 is accommodated, in particular for shock absorption, between axle cavity 40 and axle sleeve 39. This elastic material extends between the radially inwardly facing inner surface of axle cavity 40 and a radially outwardly facing base surface of axle sleeve 39 in the area of a recess 43, when viewed in the radial direction.

Recess 43 is formed like a waist-like narrowing, with respect to rotational axis y, in the area of the sleeve wall, extending hereby across a length, which may substantially correspond, when viewed in the direction of axis y, to the length of hub 41, when viewed in the same direction, in particular in the area of its axle cavity 40.

When viewed in the radial direction, the depth of the cavity may correspond to 0.5 to 0.8 times the material thickness of axle sleeve 30, configured as a whole as a tube, when viewed in the same direction.

Recess 43 may, as is also preferred, be completely filled, i.e., across the entire axial length and also across the entire radial depth, by elastic material 42. Elastic material 42, which has an overall sleeve-like configuration when viewed alone, preferably extends in the radial direction across the otherwise outer surface of axle sleeve 30, in particular across a dimension in the range of tenths of millimeters, so, for example, across a dimension of $^2/_{10}$ mm or $^3/_{10}$ mm.

Elastic material 42 may, as is also preferred, be designed as identical or similar to damping material 8 with regard to the material selected.

Thus, there also arises in the area of the wheel mounting a floating, decoupled arrangement, in which a contact of axle sleeve 39 and hub 41 is prevented in both the extension direction of axis y and also transverse hereto.

The preceding embodiments function for explaining the inventions included as a whole by the application, which refine the prior art at least due to the following combinations of features, however, also independently, wherein two, multiple, or all of these combinations of features may also be combined, namely:

A roller 1, which is characterized in that a sleeve 9 sits on pin 3, and that sleeve 9 is spaced apart from pin 3 radially and axially above by a damping material 8 arranged between sleeve 9 and pin 3, wherein damping material 8 is arranged in such a way that all axial and/or radial contact between pin 3 and sleeve 9 is prevented.

A roller, which is characterized in that pin 3 has an upwardly facing pin end face 17 and that damping material 8 is arranged overlapping pin end face 17.

A roller, which is characterized in that damping material 8 is designed between two radially opposite surfaces, an outer surface 14 of pin 3 and an inner surface 10 of sleeve 9.

A roller, which is characterized in that sleeve 9 has a downward facing sleeve end face 16 and that damping material 8 is arranged overlapping sleeve end face 16.

A roller, which is characterized in that damping material 8, designed to overlap pin end face 17, leaves a through opening 23 extending in the direction of central axis x of pin 3.

A roller, which is characterized in that sleeve 9 has a mounting formation 27 assigned to pin end face 17.

A roller, which is characterized in that mounting formation 27 is formed as a plate part having one or more openings 28, for example, for screw fixing of roller 1 to object 5.

A roller, which is characterized in that damping material 8 may be glued or welded to sleeve 9 and/or to pin 3.

A roller, which is characterized in that damping material 8 consists of one or more spring parts, a rubber material, a foamed material, or a thermoplastic elastomer.

A roller, which is characterized in that damping material 8 is designed at least across an axial height of pin 3 while leaving an axial area 15 free of damping material 8.

A roller, which is characterized in that axial area 15, free from damping material, is formed as circumferentially continuous.

A roller, which is characterized in that wheel axle 38 having an axle sleeve 39 is accommodated in an axle cavity 40 of a hub 41 of wheel 2, wherein an elastic material 42 is accommodated between axle sleeve 39 and axle cavity 40.

A roller, which is characterized in that a radial recess 43 is designed in an outer surface of axle sleeve 39 across an axial length, in which recess elastic material 42 is accommodated.

A roller, which is characterized in that elastic material 42 has a sleeve-like configuration in and of itself.

A roller, which is characterized in that elastic material 42 in the radial direction projects past an outer surface of axle sleeve 39 connecting to radial recess 43.

A roller, which is characterized in that an axial length of axial cavity 40 is adapted to the axial length of elastic material 42.

Attachment damping part 13 for a roller 1, wherein attachment damping part 13 may be arranged on a pin 3 of roller 1 overlapping pin 3, with an inner sleeve 12 and an outer sleeve 9, wherein inner sleeve 12 is spaced apart radially and axially above, with respect to a normal usage position of a roller 1 provided with attachment damping part 13, by damping material 8 arranged between inner sleeve 12 and outer sleeve 9, wherein damping material 8 is additionally arranged in such a way that all axial and/or radial contact between inner sleeve 12 and outer sleeve 9 is prevented.

An attachment damping part, can also be provided where pin 3 is formed by inner sleeve 12 and the sleeve is formed by outer sleeve 9.

An attachment damping part, which is characterized in that fixing means 29 are provided on inner sleeve 12 and facilitate a fixing of attachment damping part 13 on roller 1.

An attachment damping part, which is characterized in that fixing means 29 are designed as latching means 33.

An attachment damping part, which is characterized in that fixing means 29 are designed as screws 30.

An attachment damping part, which is characterized in that screws 30 interacting with an internal thread 31 of inner sleeve 12 are actuatable through an opening 32 in outer sleeve 9.

An attachment damping part, which is characterized in that inner sleeve 12 has a first central opening 25, and outer sleeve 9 has a second central opening 24, wherein first and second central openings 24, 25 are arranged in a projection in the direction of central axis x of pin 3 coaxially to one another and coaxially to through opening 23 of damping member 8.

An attachment damping part, which is characterized in that first and second central openings 25, 24 are connected to a plug element 35 consisting of an elastic material, that the plug element has one or more through openings 36, for example, for an electrical connecting cable 4.

All disclosed features are essential to the invention (in themselves and also in combination with one another). In the disclosure of the application, the associated/appended priority documents (scope of the previous application) are thus included completely in the contents of the disclosure, also with the purpose of including features from these documents in claims of the present application. Even without the features of a referenced claim, the subclaims characterize with their features independent, inventive refinements of the prior art in particular for carrying out divisional applications on the basis of these claims. The invention indicated in each claim may additionally have one or more of the features indicated in the preceding description, in particular provided with reference numerals and/or indicated in the list of reference numerals. The invention also relates to configurations, in which individual features listed in the preceding description are not implemented, in particular insofar as they are recognized as unessential for the respective application or may be replaced by other technically similar means.

LIST OF REFERENCE NUMERALS

1 Roller
2 Wheels
3 Pin
4 Connecting cable
5 Object
6 Socket
7 Mounting surface
8 Damping material
9 Outer sleeve
10 Inner surface
11 Annular space
12 Inner sleeve
13 Attachment damping part
14 Outer surface
15 Free area
16 Sleeve end face
17 Pin end face
18 Clearance
19 Sleeve wall 20 Sleeve cover
21 Sleeve wall
22 Sleeve cover
23 Through opening
24 Central opening
25 Central opening
26 Collar section
27 Mounting formation
28 Opening
29 Fixing means
30 Screw
31 Internal thread
32 Opening
33 Latching means
34 Counter latching means
35 Plug element
36 Through opening
37 Collar
38 Wheel axle
39 Axle sleeve
40 Axle cavity
41 Hub
42 Elastic material
43 Recess
x Pin axis
y Rotational axis

The invention claimed is:
1. A roller comprising:
a wheel,
a wheel axle on which the wheel is mounted,
a pin that protrudes upward past a roller housing and has an upward facing pin end face,
an inner sleeve that sits on the pin; and
an outer sleeve spaced apart from the pin and the inner sleeve radially by a damping material arranged between the inner sleeve and the outer sleeve, the outer sleeve having a downward facing end face;
wherein the outer sleeve is also spaced apart from the pin and the inner sleeve axially above by the damping material arranged between the outer sleeve and the upward facing pin end face,
wherein the damping material is arranged so that all axial and radial contact between the outer sleeve and the inner sleeve is prevented,
wherein the damping material is arranged to overlap the pin end face and the outer sleeve end face,
wherein the damping material configured to overlap the pin end face leaves a through opening extending in a direction of a central axis (x) of the pin; and
wherein a screw is configured to connect the inner sleeve to the pin, the screw interacts with an internal thread of the inner sleeve to engage the pin, the screw is configured to be actuated through an opening in the outer sleeve.
2. The roller according to claim 1, wherein the damping material is disposed between two radially opposite surfaces formed by an outer surface of the inner sleeve and an inner surface of the outer sleeve.

3. The roller according to claim 1, wherein the damping material is glued or welded to at least one of the outer sleeve and/or to the pin and the inner sleeve.
4. The roller according to claim 1, wherein the damping material consists of one or more spring parts, a rubber material, a foamed material or a thermoplastic elastomer.
5. The roller according to claim 1, wherein the damping material is configured to extend at least across an axial height of the pin while leaving an axial area free of the damping material.
6. The roller according to claim 5, wherein the axial area free of the damping material is configured to be circumferentially continuous.
7. The roller according to claim 1, wherein the wheel axle has an axle sleeve and is accommodated in an axle cavity of a hub of the wheel, wherein an elastic material is accommodated between the axle sleeve and the axle cavity.
8. The roller according to claim 7, wherein a radial recess is formed in an outer surface of the axle sleeve across an axial length of the axle sleeve, and wherein the elastic material is accommodated in the radial recess.
9. The roller according to claim 7, wherein the elastic material has a sleeve-shaped configuration.
10. The roller according to claim 8, wherein the elastic material projects in a radial direction past an outer surface of the axle sleeve connecting to the radial recess.
11. The roller according to claim 7, wherein an axial length of the axle cavity is adapted to an axial length of the elastic material.
12. A roller comprising:
a wheel,
a wheel axle on which the wheel is mounted,
a pin which protrudes upward past a housing of the roller in a normal usage position, the pin having an upward facing pin end face,
an inner sleeve that sits on the pin,
an outer sleeve spaced apart from the pin and the inner sleeve radially by a damping material arranged between the inner sleeve and the outer sleeve, and the outer sleeve is spaced apart from the pin and the inner sleeve axially above by the damping material arranged between the outer sleeve and the upward facing pin end face,
wherein the damping material is arranged in such a way that all axial and radial contact between the outer sleeve and the inner sleeve is prevented,
wherein the damping material leaves an area free of damping material across at least a partial axial height of the pin, so that two damping material sections are provided in a usage position of the roller: an axially lower damping area, assigned to a downward facing edge of the outer sleeve, and an axially upper damping area,
wherein a screw is configured to connect the inner sleeve to the pin, the screw interacts with an internal thread of the inner sleeve to engage the pin, the screw is configured to be actuated through an opening in the outer sleeve.

* * * * *